United States Patent [19]

Takagi et al.

[11] 4,190,372
[45] Feb. 26, 1980

[54] APPARATUS FOR TREATMENT OF SLUDGE DEPOSIT

[75] Inventors: Atsushi Takagi, Kanagawa; Hiroyuki Kuroiwa; Mitsuo Miura, both of Tokyo; Teruo Mizuhata, Hyogo; Takefumi Ito, Hokkaido; Masao Miyaguchi; Tateo Kawamura, both of Tokyo, all of Japan

[73] Assignee: Takenaka Komuten Co., Inc., Osaka, Japan

[21] Appl. No.: 755,458

[22] Filed: Dec. 30, 1976

[51] Int. Cl.² .................. B01F 3/14; B01F 15/02
[52] U.S. Cl. .................... 366/141; 366/153; 366/160; 366/182; 366/186
[58] Field of Search ................. 259/4 R, 154

[56] References Cited

U.S. PATENT DOCUMENTS

| | | | |
|---|---|---|---|
| 3,380,717 | 4/1968 | Adams | 259/154 |
| 3,638,916 | 2/1972 | Ursic | 259/4 R |
| 3,820,762 | 6/1974 | Bastrom | 259/154 |
| 3,822,056 | 7/1974 | Hanes | 259/154 |
| 3,986,708 | 10/1976 | Heltzel | 259/154 |

Primary Examiner—Herbert F. Ross

[57] ABSTRACT

Sludge deposit is stored in a sludge deposit receiving hopper, and the stored sludge deposit is fed onto a belt conveyor and transferred to a mixer. A hardener is fed to this mixer from a hardener hopper. A conveyor belt is disposed on the belt conveyor to measure the quantity of the sludge deposit transferred by the belt conveyor. According to this measured value of the transferred sludge deposit, the quantity of the sludge deposit fed from the sludge deposit receiving hopper and the quantity of the hardener fed from the hardener hopper are controlled. The sludge deposit is mixed and kneaded with the hardener, and the sludge deposit is solidified.

6 Claims, 5 Drawing Figures

APPARATUS FOR TREATMENT OF SLUDGE DEPOSIT

BACKGROUND OF THE INVENTION

The present invention relates to an apparatus of the treatment of sludge deposit for continuously solidifying the sludge deposit.

It is a long time since occurrence of environmental pollution by discarfed industrial wastes such as sludge deposits became at issue. Even if various treatment methods and apparatuses have actually been worked, accumulation of these industrial wastes such as sludge deposits in harbors, lakes, bays, rivers and the like is now increasing, and it has been proven that disposal of these wastes is very difficult.

Methods actually adopted at the present for the treatment of sludge deposits, other sludges and industrial wastes are roughly divided in the following three types:
 (1) A method in which sludge deposit is solidified at the deposition position by using a hardening chemical.
 (2) A method in which sludge deposit is divided into units having a certain volume and these units are confined independently.
 (3) A method in which sludge deposit is removed by dredging and the dredged sludge is mixed and kneaded with a hardener to solidify it.

These methods have both merits and demerits and they are appropriately adopted according to practical treatment conditions.

The present invention belongs to the above-mentioned type (3). According to the conventional technique of the type (3), sludge deposit and a hardener are charged in metering devices, respectively, and after they have been metered, they are mixed and kneaded in a mixer. Alternately, prescribed amounts of the sludge and hardener are fed into a store tank and they are mixed and kneaded in the store tank by means of a moving type stabilizer mixer or the like. Accordingly, the treatment is carried out batchwise in most of the conventional methods of the type (3), and hence, the treatment efficiency is low.

Therefore, because of such low treatment efficiency the conventional methods fail to cope with sludge deposit, accumulation of which is increasing at a very high rate in these days.

SUMMARY OF THE INVENTION

In the sludge deposit treatment apparatus of the present invention, dredged sludge deposit is stored in a sludge deposit receiving hopper. A belt conveyor is disposed to transfer the sludge to a mixer where the sludge is mixed and kneaded with a hardener. A conveyor scale is mounted on the conveyor belt to measure the amount transferred of the sludge continuously. According to the measured value of the quantity of the sludge, feeding of the sludge from the sludge deposit receiving hopper or feeding of the hardener from a hardener hopper is controlled so that the feed ratio of the sludge deposit and hardener is kept constant continuously.

In short, according to the sludge deposit treatment apparatus of the present invention, the dredged sludge deposit can be continuously fed to the mixer and the solidifying treatment of the dredged sludge deposit can be performed at a highly enhanced efficiency.

Further, in the treatment apparatus of the present invention, the quantity of the sludge fed to the mixer is continuously measured, and according to this measured value, the feed rate of the hardener is controlled, so that the ratio of the sludge deposit and hardener fed to the mixer is kept constant and a condition suitable for solidification of the sludge deposit can always be attained.

Moreover, in the treatment apparatus of the present invention, an electric control device is disposed so that it can be appropriately changed over so that the mixing ratio of the sludge deposit and hardener is controlled to a constant level selected appropriately depending on the properties of the sludge deposit and other factors. Further, when this electric control device does not work well because of special conditions in the sludge deposit or the like, improper control operations of this electric control device are temporarily corrected.

Accordingly, the treatment of solidifying sludge deposit can be performed at a very high efficiency with use of a much reduced amount of the hardener and a power-saving effect can be attained in the treatment with economical advantages.

DESCRIPTION OF THE PREFERRED EMBODIMENTS

The present invention will now be described by reference to embodiments shown in the accompanying drawings.

Figure 1:
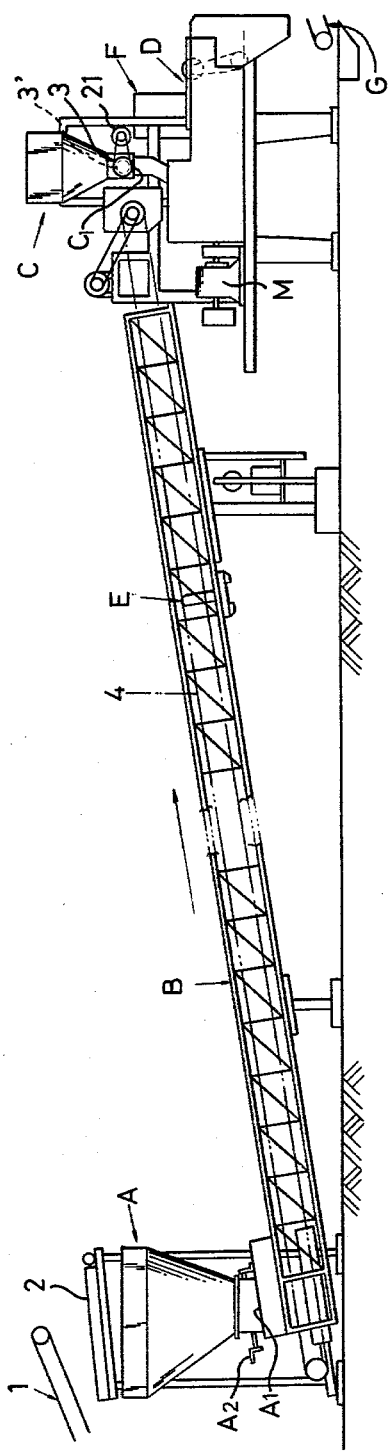
FIG. 1 is an entire side view of one embodiment of the sludge deposit treatment apparatus of the present invention.

As illustrated in FIG. 1, the sludge deposit treatment apparatus of the present invention comprises a sludge deposit receiving hopper A, a belt conveyor B, a hardener hopper C having on a gate thereof a hardener feed mechanism such as a rotary feeder, a stabilizer mixer D, a conveyor scale E and a control device F.

The sludge deposit receiving hopper A feeds a prescribed amount of sludge deposit to the belt conveyor B from a gate $A_1$. The degree of the opening of the gate $A_1$ is set by a handle $A_2$ and the amount of the sludge deposit passing through the gate $A_1$ is decided by this degree of the opening.

The hardener hopper C feeds a hardener to the stabilizer mixer D from a gate $C_1$. A rotary feeder $3'$ is mounted on the gate $C_1$. Rotation of the rotary feeder $3'$ is controlled by the electric control device F detailed hereinafter so that the hardener in an amount corresponding to the feed amount of the sludge is passed through the gate $C_1$.

In the treatment apparatus having the above-mentioned main structure, the sludge deposit treatment is conducted in the following manner.

Sludge deposit dredged according to an appropriate method is fed to the sludge deposit receiving hopper A through a delivery device 1, for example, a belt conveyor laid out between the dredging position and the hopper A. During this transportation, large and coarse rubbishes and the like are removed by a screening device 2. The sludge deposit stored in the hopper A is fed to the belt conveyor B through the gate opened to a prescribed dgree, and delivered and fed continuously to the stabilizer mixer D by the belt conveyor B. Simultaneously, the hardener in the hardener hopper C is fed to the stabilizer mixer D by the feed mechanism 3, for example, the rotary feeder 3' as shown in FIG. 1. The sludge deposit and the hardener are mixed and kneaded by the stabilizer mixer D driven by the motor M, and the mixture is agitated at a high speed and the thus treated sludge deposit is delivered to a transporting vehicle or a reclaimed land or the like by a delivery device G including a belt conveyor or the like.

As is seen from the foregoing illustration, according to the present invention, the sludge deposit is continuously delivered and treated, and the amount fed of the sludge deposit is always measured by the conveyor scale E disposed in the transportation course of the belt conveyor and the rotation number of the rotary feeder 3' is controlled by the electric control device F connected to the scale E so that the mixing ratio of the amount of the hardener to the weight of the sludge deposit set depending on the properties (the water content and the like) of the sludge deposit is maintained. Thus, the amount of the hardener is controlled to a minimum necessary amount according to the amount fed of the sludge deposit and the thus fed hardener is mixed and kneaded with the sludge deposit.

The conveyor scale E and the electric control device F will now be described.

Figure 2:
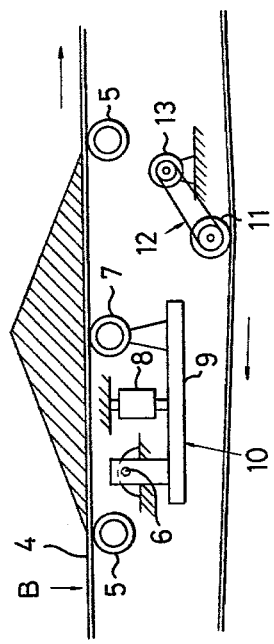
FIG. 2 is a view showing the structure of a conveyor scale.
Figure 3:
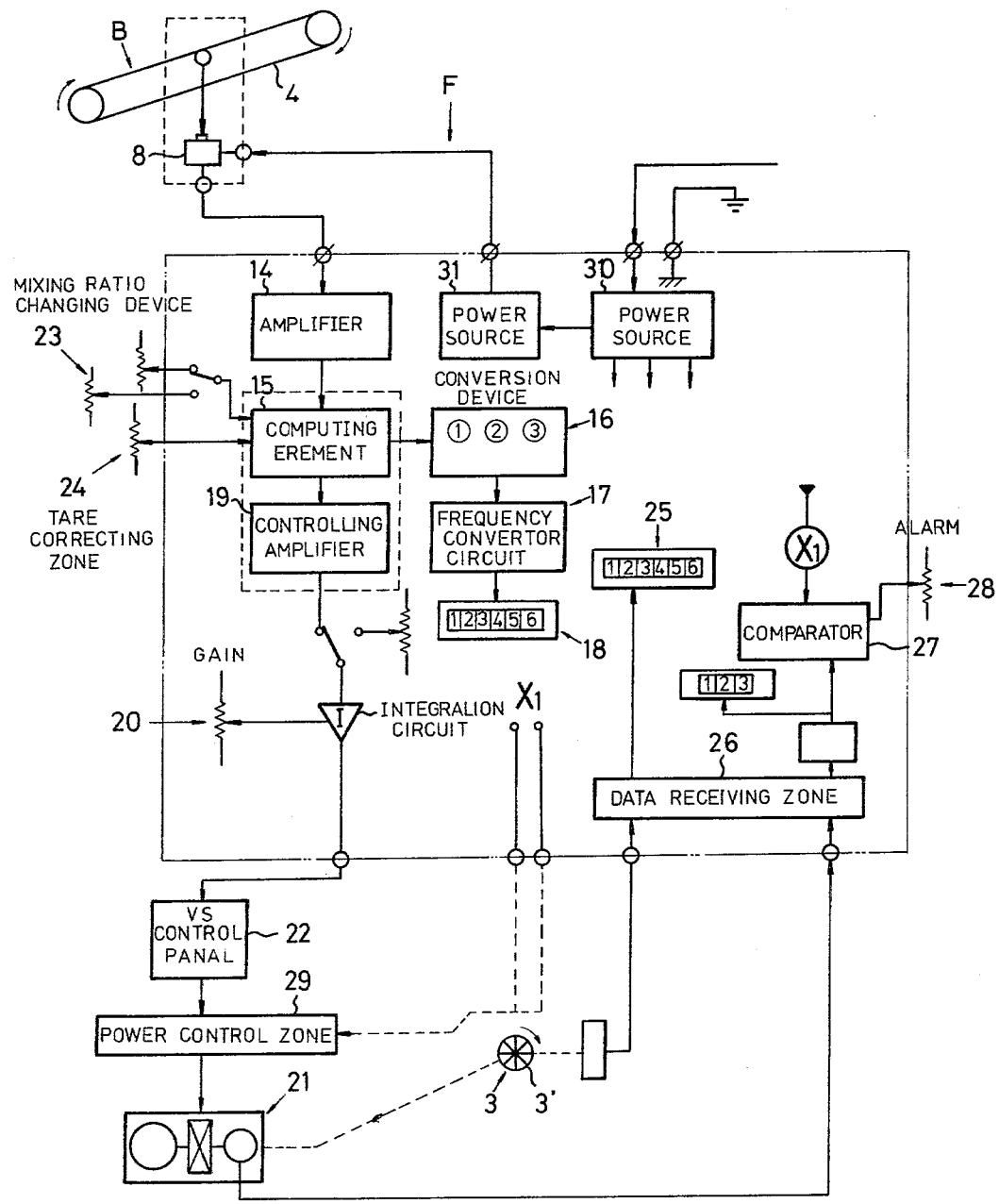
FIG. 3 is a block diagram showing the conveyor scale and a control device therefor.

As is shown in FIGS. 2 and 3, the conveyor scale E comprises a metering device 10 for measuring the weight of the sludge deposit and a meter for measuring the speed of the conveyor belt 4. The metering device 10 has the following structure.

This device 10 includes a lateral rod 9, and one end of the rod 9 is pivoted with a fulcrum 6 between rollers 5 supporting the conveyor belt 4, and a metering roll 7 is disposed on the other end of the rod 9 and a load cell 8 is disposed in the intermediate portion of the rod 9.

The meter for measuring the speed of the belt conveyor B has the following structure.

More specifically, the meter includes a bend pulley 11 disposed in contact with the conveyor belt, an appropriate power transmission mechanism 12 fot transmitting the rotation of the bend pulley correctly and a pulse generator 13 disposed through this power transmission mechanism 12. The weight of the sludge deposit being transported on the conveyor belt is measured by the load cell 8 and the speed of the conveyor belt is detected by the pulse generator 13. Signals from both the load cell 8 and the pulse generator 13 are transmitted to the electric control device F and are electrically integrated to control a VS motor 2' driving the rotary feeder 3'. Simultaneously, the total amount of the sludge deposit fed by the belt conveyor B is digitally displayed in the electric control device F.

The amount of the sludge deposit fed from the sludge deposit receiving hopper A to the belt conveyor B is to be kept constant so far as the degree of the opening in the gate $A_1$ is constant, but because of the difference of the viscosity, the water content or the like or depending on the amount of the sludge deposit stored in the sludge deposit receiving hopper A, the amount fed of the sludge deposit is changed even if the opening degree of the gate $A_1$ is kept constant. Therefore, in the present invention, the amount fed of the sludge deposit is measured and the amount fed of the hardener is controlled based on this measured value.

The conveyor scale E and the control device F will now be described by reference to the block diagram of FIG. 3.

The weight of the sludge deposit on the belt conveyor B and the speed of the belt conveyor are detected by the load cell 8 and the pulse generator 13, respectively. The detection signals are introduced into an amplifier 14, a computing element 15 and a conversion device 16 and the electric analog data are converted to digital data.

Then, the frequencies are converted by a frequency converter circuit 17 and the amount fed of the sludge deposit is digitally displayed in an indicator 18.

The integrated signals of the weight of the sludge deposit and the speed of the belt conveyor are introduced from the computing element 15 to a controlling amplifier 19. Output signals from the controlling amplifier 19 are gained and controlled by an integration circuit I and a gain 20, and direct current signals are put in a VS control panel 22 of a VS motor 21. In this case, the signals pass through a power control zone 29 described below, but they are not converted or controlled by this control zone 29. The VS motor 21 is controlled and driven by the above input signals to control continuously the rotation of the rotary feeder 3'. A change-over switch is disposed between the controlling amplifier and the integration circuit I, whereby the automatic operation of driving and controlling the rotary feeder 3' can be changed over to the manual operation according to need.

By the above-mentioned arrangement, the hardener is fed at a rate controlled according to the amount fed of the sludge deposit, and the mixing ratio of the hardener to the sludge deposit can be kept constant. Accordingly, even if sludge deposit or the like is continuously fed to the stabilizer mixer D, the intended solidifying treatment can be accomplished.

Suitable mixing ratios of the amount of the hardener to the weight of the sludge deposit which are variable depending on the properties of the sludge deposit are stored in the electric control device F, and the rotation number of the rotary feeder 3' is controlled so that the prescribed value of the above mixing ratio can be attained. More specifically, a device 23 for changing the mixing ratio of the hardener is connected to the computing element 15 so that the mixing ratio can be changed in several stages in the range of 3 to 10% or 6 to 20% based on the unit weight of the sludge deposit. Thus, the mixing ratio of the hardener is set and controlled by the above-mentioned change-over operation of the mixing ratio changing device 23. The rotation number of the rotary feeder 3' is integrally displayed on an indicator 25, and when the rotation number of the rotary feeder 3' is smaller than the prescribed value, an output signal from a data receiving zone 26 is detected by a comparator 27 to give warning by an alarm 28. This warning is given when the properties of the sludge deposit, such as the viscosity and water content, are in peculiar conditions or when a trouble takes place in an electric power source.

When the rotation number of the rotary feeder 3' is insufficient, a relay $X_1$ is put on and the input signal of the VS motor 21 is converted and controlled by the power control zone 29 and the rotation number of the rotary feeder 3' is controlled to the set value by the VS motor 21. In this case, the value of the amount fed of the sludge deposit displayed on the indicator 18 is referred to.

In the present invention, the sludge deposit transfer passage is covered with a suitable member so that occurrence of secondary pollutions such as scattering of sludge or generation of bad smells is prevented.

In FIG. 3, reference numeral 24 represents a tare correcting zone in the sludge amount measuring device, and reference numeral 30 represents a power source of the control device F. In this embodiment, a single phase alternating current of 100 V, 50/60 Hz and 500 VA is used for the power source 30. Reference numeral 31 denotes a power source for driving the load cell 8.

As is apparent from the foregoing illustration, according to the sludge deposit treatment apparatus of the present invention, dredged sludge deposit is delivered by the belt conveyor and the hardener is simultaneously supplied, and they are mixed and kneaded in the mixer and continuously subjected to the solidification treatment. Thus, according to the present invention, a sludge deposit treatment system having a remarkably improved treating capacity can be established, and the treating efficiency can be highly improved over the conventional treatment methods of this type.

Furthermore, according to the present invention, the quantity of sludge deposit being fed is detected during the delivery course by the conveyor scale, the ratio of the amounts of the sludge deposit and hardener fed to the stabilizer mixer is always kept constant, and the sludge deposit treatment can always be performed in good conditions.

Still in addition, in the present invention, since the electric control device is arranged so that it can be changed over so as to feed the hardener in an amount adjusted appropriately depending on the properties of the sludge deposit in correspondence to the amount fed of the sludge deposit. Therefore, by this change-over operation of the electric control device as well as the above-mentioned control of the amount fed of the hardener, the amount of the hardener can be reduced to a minimum necessary level, and hence, the sludge deposit treatment can be performed effectively at a low running cost. Moreover, the treatment can be accomplished automatically and mechanically in the present invention, and a labor-saving effect and a power-saving effect can be attained and the running cost can be reduced. When control of feeding of the hardener is out of order, warning is given and the feed rate of the hardener can be corrected. Therefore, the present invention makes great contributions to prevention of environmental pollution by sludge deposits, other sludges and industrial wastes.

A second embodiment of the present invention will now be described. Although the amount fed of the hardener is controlled in the above-mentioned first embodiment, in this second embodiment the amount fed of sludge deposit is controlled.

Figure 4:
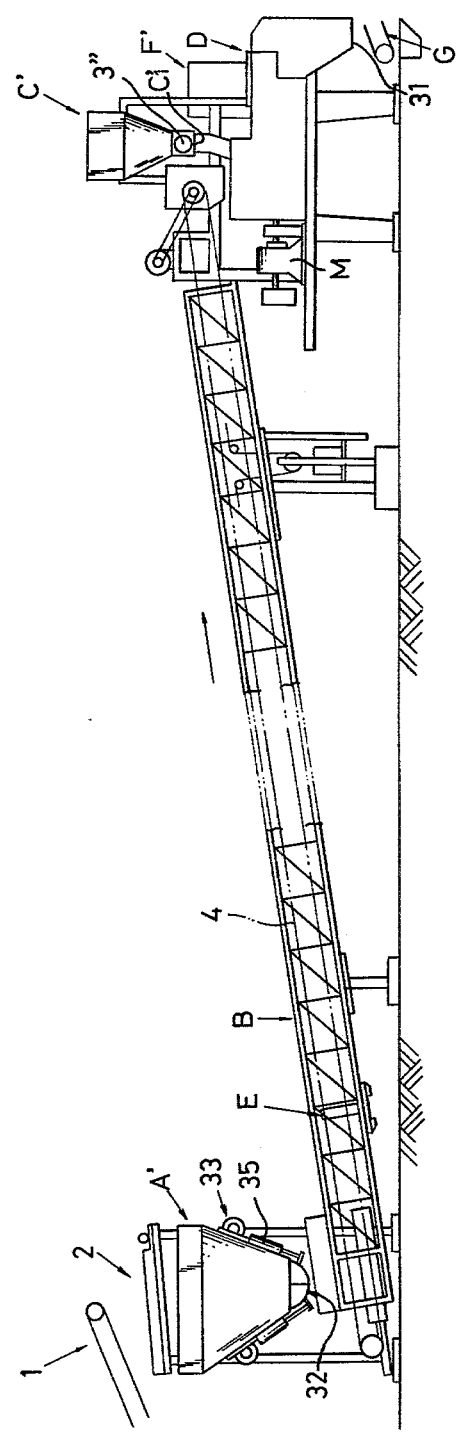
FIG. 4 is an entire side view of a second embodiment of the sludge treatment apparatus of the present invention.
Figure 5:
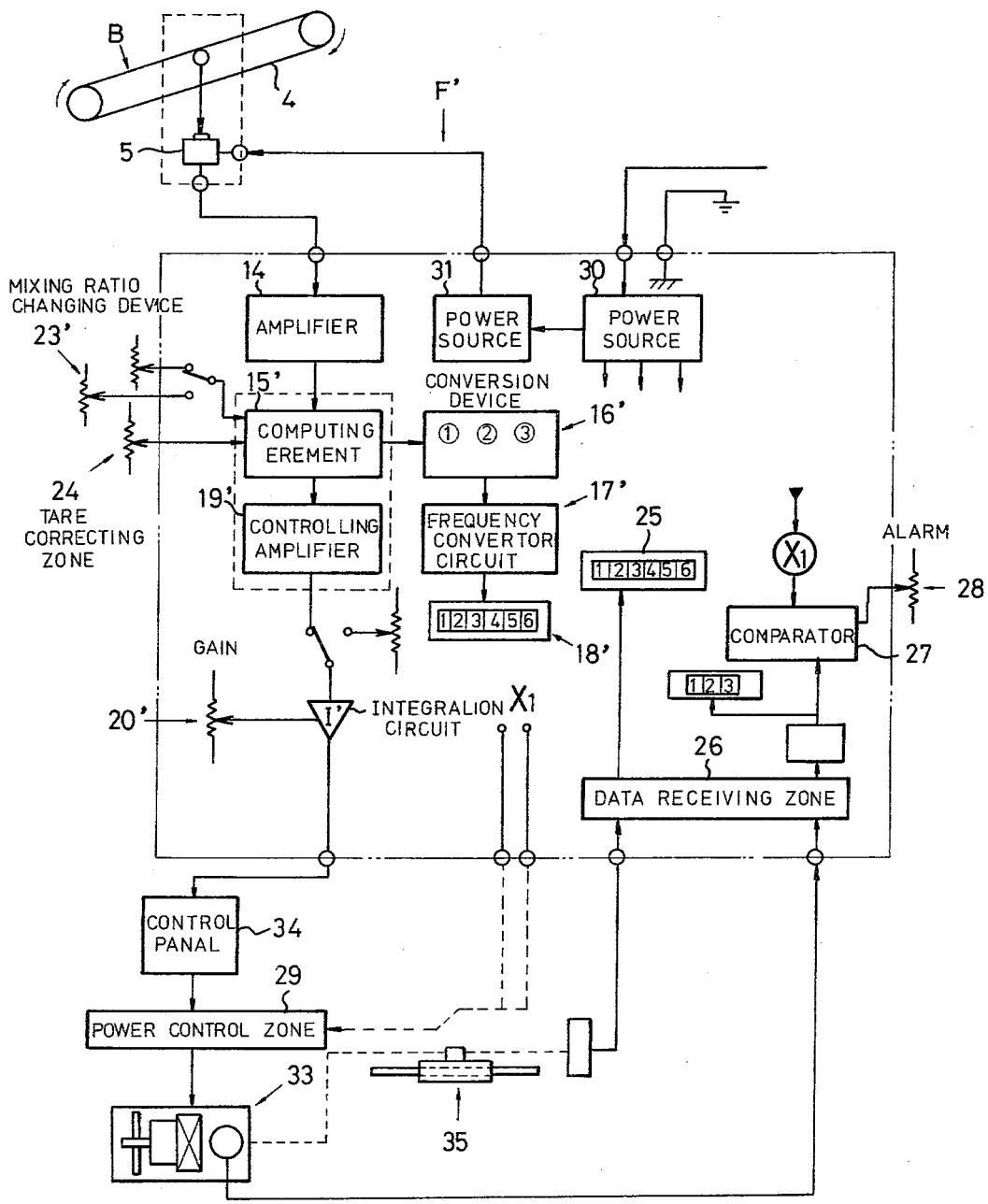
FIG. 5 is a block diagram showing a conveyor scale and a control device in the second embodiment.

The sludge deposit treatment apparatus of the second embodiment comprises, as shown in FIG. 4, a sludge deposit receiving hopper A', a sludge deposit transferring belt conveyor B having one end disposed below a gate of the hopper A', a mixer D such as a stabilizer mixer connected to the outlet side of the belt conveyor B to mix and knead the sludge deposit and hardener, a hardener hopper C' disposed above the mixer D and a conveyor scale E. This treatment apparatus further comprises an electric control device F' for controlling the degree of the opening of the sludge deposit receiving hopper A' in response to output signals from the conveyor scale E as shown in FIG. 5. The sludge deposit receiving hopper A' feeds sludge deposit from a gate 32 to the belt conveyor B. The degree of the opening of the gate 32 is controlled by an adjustment mechanism 35 such as a hydraulic cylinder, and the sludge deposit is fed in an amount corresponding to the controlled degree of the opening of the gate 32. The adjustment mechanism 35 is driven by a driving member 33 such as a hydraulic pump and the driving member 33 is controlled by a control panel 34 which is in turn controlled by the electric control device F'.

The hardener hopper C' feeds a hardener at a prescribed rate from a gate C'$_1$ to the stabilizer mixer D. A rotary feeder 3" is mounted on the gate C'$_1$ so as to keep constant the rate of feeding of the hardener passing through the gate C'$_1$.

The treatment by the above-mentioned sludge deposit treatment apparatus of the second embodiment of the present invention is carried out in the following manner. The treatment procedures in this second embodiment are principally similar to those in the first embodiment.

Sludge deposit dredged according to an appropriate method is fed to the sludge deposit receiving hopper A' by a delivery device 1, for example, a belt conveyor, and during this tranportation, large and coarse rubbishes and the like are removed by a screening device 2. The sludge deposit stored in the hopper A' is first fed to the belt conveyor B from the gate 32, and the weight of the sludge deposit is detected by the conveyor scale E disposed in the midway of the belt conveyor B and output signals from the conveyor scale E are introduced into the driving member 33 through the electric control device F', whereby the degree of the opening of the gate 32 of the hopper A' is adjusted and only the prescribed amount of the sludge deposit is fed to the conveyor B.

Even if the degree of the opening of the gate 32 of the sludge deposit receiving hopper A' is kept constant, the amount of the sludge deposit passing through the gate 32 is changed depending on variations in the properties (such as the viscosity and water content) of the sludge deposit or the change in the quantity of the sludge deposit stored in the sludge deposit receiving hopper A'. In order to correct this deviation of the amount of the sludge deposit passing through the gate 32, the degree of the opening of the gate 32 is controlled.

The sludge deposit fed onto the conveyor B is continuously introduced into the mixer D, and simultaneously, the hardener is continuously fed at a prescribed rate to the mixer D and mixed and kneaded with the sludge deposit in the mixer D. Then, the so treated sludge deposit is discharged from the mixer D and transported to a transporting vehicle or a reclaimed land or the like by a delivery device G.

In this second embodiment, as is seen from the foregoing illustration, the sludge deposit is continuously fed and treated. The amount fed of the sludge deposit is always detected by the conveyor scale E disposed in the sludge transporting course of the belt conveyor. Output signals from the conveyor scale E are put in the electric control device F' and the driving member 33 of the adjustment mechanism 35 is controlled by the electric control device F' according to said signals. The control device F' controls the driving member 33 depending on the properties of the sludge deposit and on the amount fed of the sludge deposit, and the controlled amount of the sludge deposit is fed onto the belt conveyor B from the gate 32. Thus, in the present second embodiment, the hardener is fed at a prescribed rate but the feed rate of the sludge deposit is controlled and adjusted, whereby a prescribed mixing ratio is attained between the sludge deposit and the hardener in the mixer D.

The structure and operation of the conveyor scale E in this second embodiment are the same as those of the conveyor scale described hereinbefore by reference to the first embodiment shown in FIG. 2. Accordingly, detailed illustration of this conveyor scale E is omitted.

The electric control device F' will now be described as well as the conveyor scale E by reference to the block diagram of FIG. 5. The operation and structure of the electric control device F' are principally similar to those of the control device F of the first embodiment shown in FIG. 3.

The conveyor scale F' includes a metering device 10 and a pulse signal generator 13 to detect the weight of the sludge deposit and the speed of the conveyor belt, respectively, and emit detection signals. These output signals are introduced into an amplifier 14, a computing element 15' and a convertor 16' where electric analog data are converted to digital data. The frequencies are changed by a frequency converting circuit 17' and the weight of the sludge deposit is digitally displayed on an indicator 18'.

An integration signal showing the amount fed of the sludge deposit, which is put out from the computing element 15', is put in a controlling amplifier 19', and the output signal from the controlling amplifier 19' is gained and controlled by an integration circuit I' and a gain 20'. The controlled signal is converted to a direct current voltage signal and put in a control panel 34 of the driving member 33 controlling the degree of the opening of the gate 32. In this case, the signal is not controlled by the power controlling zone 29. Thus, the driving member 33 is controlled so that the degree of the opening of the gate 32 is controlled by the gate adjustment mechanism 35.

The sludge deposit stored in the sludge deposit receiving hopper A' is once fed onto the belt conveyor but since the weight of the sludge deposit is detected by the conveyor scale E disposed in the vicinity of the gate 32 of the hopper A', the degree of the opening of the hopper A' is adjusted in the above-mentioned manner, only a prescribed amount of the sludge deposit is fed onto the belt conveyor. The hardener is continuously fed at a prescribed feed rate to the mixer D by the rotary feeder 3" disposed on the gate of the hardener hopper C'. In this manner, the mixing ratio of the sludge deposit and hardener fed to the mixer D can be kept constant.

Appropriate mixing ratios of the hardener to the weight of the sludge deposit, which are varied depending on the properties of the sludge deposit, such as the water content and viscosity, are stored in advance in the electric control device F', and the driving member 33 is controlled so that an appropriate mixing ratio can always be attained between the sludge deposit and the hardener in the mixer D.

This control is performed in the same manner as described hereinbefore by reference to the first embodiment, and the mixing ratio can be appropriately changed over by a mixing ratio setting change-over member 23'.

When the electric control F' is out of order, namely when the driving power of the driving member 33 is lower than the prescribed level, warning is given by an alarm 28, and the driving power of the driving member 33 is controlled by a relay $X'_1$ in the same manner as in the first embodiment.

Members of the second embodiment having the same functions as the corresponding members in the first embodiment are shown and indicated in FIGS. 4 and 5 by the same reference numerals as used in FIGS. 1 to 3.

As is apparent from the foregoing illustration, according to the present invention, dredged sludge deposit is transferred by the belt conveyor to the mixer and the hardener is simultaneously fed to the mixer, and they are mixed and kneaded and the solidification treatment of the sludge deposit is continuously performed. Therefore, the sludge deposit treatment system having a very high treatment capacity can be established according to the present invention, and a large volume of sludge deposit can be treated at a very high efficiency. Further, the feed rate of the sludge deposit is controlled by controlling the degree of the opening of the gate of the sludge deposit receiving hopper by output signals from the conveyor scale detecting the amount fed of the sludge deposit through the electric control device. Accordingly, the amount fed of the sludge deposit is controlled to a prescribed level set so that an appropriate mixing ratio of the hardener fed continuously at a fixed rate to the weight of the sludge deposit is always attained depending on the properties of the sludge deposit and other conditions. Therefore, the treatment is always carried out in good conditions while maintaining the prescribed mixing ratio of the hardener, and there is attained an advantage that the sludge deposit treatment can be performed very effectively with use of a reduced amount of the hardener at a very low running cost. In short, wasteful consumption of the hardener can be effectively prevented. Moreover, even when control of the amount fed of the sludge deposit is out of order, the disorder can easily be regulated by the relay $X'_1$.

Still further, constant rate feeding of the hardener is automated and control of the amount fed of the sludge deposit is performed automatically and mechanically. Accordingly, a power-saving effect can be attained and labor expenses can be remarkably reduced with a greatly enhanced productivity. It is therefore expected that the treatment system according to the present invention will be effectively utilized for reclaiming and the like as a source-saving treatment system.

What is claimed is:

1. An apparatus for the treatment of sludge deposits by mixing and kneading the sludge with a hardener to solidify the sludge deposit, said treatment apparatus comprising:
   a sludge hopper for receiving and storing therein dredged sludge, said sludge hopper having a gate means for discharging the sludge;
   a hardener hopper for storing hardener therein, said hardener hopper including a rotary feeder for controllably discharging the hardener;
   a mixer for mixing and kneading the sludge and hardener;
   a conveyor belt for transporting the sludge from said gate means to said mixer;
   a conveyor scale connected to said conveyor belt for measuring the amount of sludge on said conveyor, said scale including a load cell and a meter for measuring the speed of said belt; and an electric control device for controlling said rotary feeder in response to output signals from said scale;

whereby the ratio between the amount of sludge and the amount of hardener fed to the mixer is maintained at a prescribed level.

2. A sludge deposit treatment apparatus according to claim 1 wherein appropriate mixing ratios of the amount of the hardener to the weight of the sludge deposit, which are varied depending on the properties of the sludge deposit and other conditions, are stored in advance in said electric control device and said electric control device is changed over by a change-over device depending on the properties of the sludge deposit and other conditions.

3. A sludge deposit treatment apparatus according to claim 1, further comprising an adjustment device disposed so that when said electric control device controlling hardener feed rate control device is out of order, warning is given and the feed rate of the hardener is corrected by said adjustment device.

4. An apparatus for the treatment of sludge deposits by mixing and kneading the sludge with a hardener to solidify the sludge deposit, said treatment apparatus comprising:

a sludge hopper for receiving and storing therein dredged sludge, said sludge hopper having a gate means for discharging the sludge;

a hardener hopper for storing hardener therein, said hardener hopper including means for discharging hardener from said hardener hopper at a constant rate;

a mixer for mixing and kneading the sludge hardener;

a conveyor belt for transporting the sludge from said gate means to said mixer;

a conveyor scale connected to said conveyor belt for measuring the amount of sludge on said conveyor, said scale including a load cell and a meter for measuring the speed of said belt;

sludge feed rate control means for controlling the rate at which the sludge is discharged through said gate by opening and closing said gate with a hydraulic cylinder; and an electric control device for controlling said feed rate control means in response to output signals from said scale;

whereby the ratio between the amount of sludge and the amount of hardener fed to the mixer is maintained at a prescribed level.

5. A sludge deposit treatment apparatus according to claim 4 wherein appropriate mixing ratios of the amount of the hardener to the weight of the sludge deposit, which are varied depending on the properties of the sludge deposit and other conditions, are stored in advance in said electric control device and said electric control device is changed over by a changeover device depending on the properties of the sludge deposit and other conditions.

6. A sludge deposit treatment apparatus according to claim 4, further comprising an adjustment device disposed so that when said electric control device controlling the sludge feed rate control means is out of order, warning is given and the feed rate of the sludge deposit is corrected by said adjustment device.

* * * * *